March 7, 1961 W. G. SCHARF 2,974,055
LUSTROUS FABRICS AND METHODS OF PRODUCING SAME
Filed June 18, 1956

INVENTOR.
WALTER G. SCHARF
BY
Kenyon & Kenyon
ATTORNEYS

United States Patent Office 2,974,055
Patented Mar. 7, 1961

2,974,055

LUSTROUS FABRICS AND METHODS OF PRODUCING SAME

Walter George Scharf, Forest Hills, N.Y., assignor to Metal Film Company, Inc., New York, N.Y., a corporation of New York Filed June 18, 1956, Ser. No. 591,833

11 Claims. (Cl. 117—4)

The present invention relates to lustrous fabric materials and to improved techniques for making such materials. More particularly, the invention deals with synthetic textile threads having a specular metallic appearance. These threads when woven, plaited, knitted or otherwise fabricated will produce a highly decorative material suitable in a large variety of textile designs and applications.

The use of metallized threads in fabric design is of ancient origin, such threads serving to enhance the beauty of the material and to impart a distinctive glitter thereto. To obviate the drawbacks inherent in metallized threads having a core or base of natural fibre, it has been the practice in recent years to form such threads with thermoplastic materials of superior tensile strength. In one known commercial form, the thread is constituted by a laminated continuous material made up of at least two plies of normally transparent plastic strips, a strip of metal foil being interposed therebetween. The various strips are bonded together by means of an appropriate adhesive. In another form of this thread, in place of the metal foil, a thin deposit of metal is coated on one surface of a base ribbon, a second ribbon being secured by adhesive to the coated surface of the first ribbon. These ribbons may be composed of cellulosic material, such as cellulose butyrate, although non-cellulosic lamina may also be used, such as films of polymerized ethylene glycol terephthalate, the latter being known industrially as Mylar.

Thus whether the metallized thread is of the first form embodying a metal foil or in the second form including a metal deposit, an adhesive is necessarily entailed to effect the desired lamination. Such laminated threads suffer from a number of disadvantages which militate against their commercial acceptance. For example, the adhesive not only must be capable of producing a firm and permanent bond between the plies but it must also be capable of bending without cracking so as not to impair the flexibility of the thread.

In practice these stringent requirements are difficult to satisfy and there is a tendency for the thread to delaminate with time or to delaminte in the course of processing the fabric in which the metallized yarn has been woven. In such processes as sanforizing, caustic or peroxide bleaching and commercial washing and dry cleaning, when laminated threads are incorporated in the fabric being treated, delamination is frequently encountered. Moreover, the adhesive acts also to reduce the brilliance of the thread, for it is physically interposed between the reflective metal surface and the transparent top lamina, and acts to fog the metallic luster.

The use of Mylar in metallized threads is of growing importance by reason of the exceptional structural properties of this material. This has created a further problem for it has been found that the very adhesives which are best capable of bonding Mylar are most difficult to run in a laminating machine. Furthermore Mylar is highly expensive, and a thread necessarily employing at least two plies of Mylar is quite costly as compared to other plastic materials.

In view of the foregoing, it is the principal object of this invention to provide an improved lustrous thread which is free of the drawbacks characterizing laminated threads and presents a brilliant metallic appearance.

More specifically, it is an object of the invention to provide a metallized thread wherein a metal deposit is coated with a transparent film which is related structurally to and has an affinity for the web which is metallized. A significant feature of the invention resides in the fact that the metallized thread is produced entirely without adhesives. The thread is inherently incapable of delamination, it is highly flexible and has greater tensile strength.

Also an object of the invention is to provide an improved process for producing metallized thread efficiently and at high speed.

Yet another object of the invention is to provide a metallized thread whose integrity will be maintained when the thread is woven in a fabric which is subjected to dyeing, cleaning and other chemical processes.

A further object of the invention is to provide a relatively inexpensive metallized thread including Mylar material whereby increased yardage per pound of Mylar is obtained as compared with conventional laminated thread structures.

Briefly stated, in a metallized thread in accordance with the invention, a transparent flexible plastic web is first coated on one side with a deposit of metal. The surface of the metal deposit is then covered with a plastic solution or suspension which when dried and cured affords an adherent transparent film. The plastic coating is a material related structurally to the web and having an affinity therefor.

For a better understanding of the invention as well as other objects and further features thereof, reference is made to the following detailed description to be read in conjunction with the accompanying drawing.

Figures 1, 2:
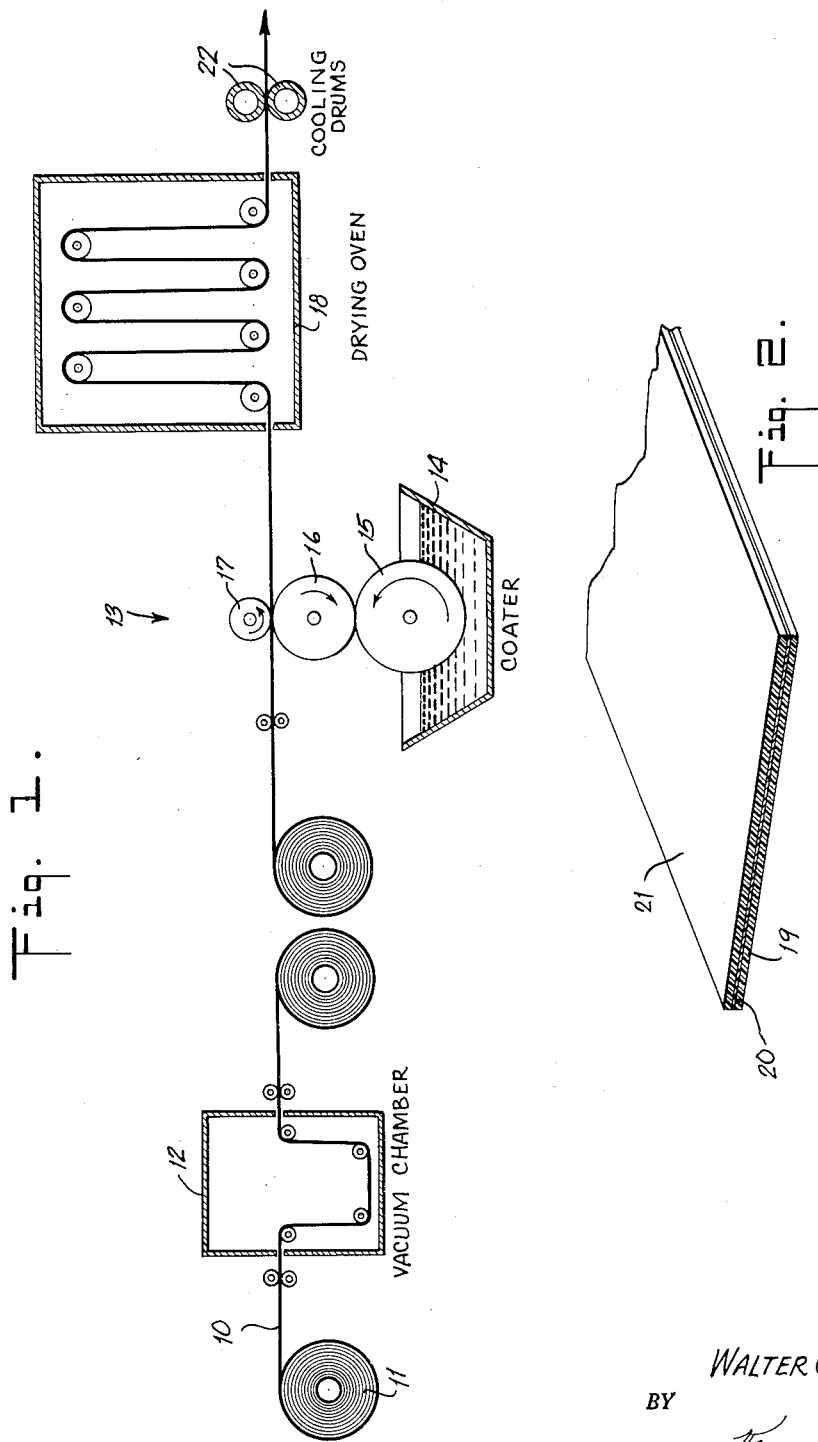
Fig. 1 is a schematic diagram showing the process in accordance with the invention adapted to produce a metallized synthetic thread.
Fig. 2 is a perspective view of metallized thread according to the invention.

As shown in Fig. 1, in a process in accordance with the invention for producing a metallized thread, a continuous web of transparent thermoplastic material 10 is drawn from a supply roll 11 and is caused to travel through a high vacuum chamber 12 in which one surface of the film is metallized. The web may be constituted by cellophane, acetate, tri-acetate, acetate butyrate, polymerized ethylene glycol terephthalate (Mylar) or any other suitable transparent and flexible material capable of being vacuum plated. The thickness of the web for ordinary yarn should not exceed 2 mils but of course other thicknesses may be used in other applications.

In the vacuum chamber, one surface of the film is metal-plated by gold, silver aluminum, magnesium, titanium, nickel or any other metal, the thickness of the metal layer preferably not exceeding $\frac{1}{50,000}$ of an inch. The deposition may be carried out by known thermal evaporation or cathodic sputtering techniques. In thermal evaporation, metal vapor is generated by direct heat such as an electric arc source or a glowing filament. To effect maximum adherence of the plated film, the metal atoms should pass linearly from their source to the surface to be coated and this requires the maintenance of pressures of about $10^{-4}$ of mercury in the vacuum chamber. In cathode sputtering, a high voltage is impressed between an anode and a cathode of the plating metal. The cathode is vaporized by positive-ion bombardment, some of the vapor diffusing away from the cathode and depositing on the web to be plated. The voltage requirements depend on the nature of the cathode metal. At pressures of 0.01 to 0.10 mm. of mercury necessary to maintain the glow discharge, the ordinary laws of diffusion prevail. After plating the web is re-rolled in preparation for the next step.

To produce a yarn having the color properties of the metal deposit, the metallized web is then coated on the metal side with a transparent plastic in solution or suspension which is related structurally to and has an affinity for the web which is metallized. That is to say, the plastic coating must have substantially the same tensile strength and elongation characteristics as the web material. This coating can be applied by a roller coater, a reverse roller coater, or by the flexographic or rotogravure process. By way of illustration, Fig. 1 shows a direct three roll coater. The coater, generally designated by numeral 13, includes a bath 14 for containing the liquid, a first roller 15 which is rotatable within the bath and acts to apply the liquid to a second roller 16 which engages the metallized surface of the web 10, the web being pressed against the second roller by means of a third roller 17.

The wet plastic coating formed on the web 10 is then dried and cured by passing the web through an oven 18 which is properaly heated and vented to drive off all solvents and at the same time to effect the curing of the coated material. For heating purposes, steam, gas heat or infra-red radiation may be employed, as desired. The temperature of the oven and the travel time therethrough are determined by the specific web and coating materials. The coating is further cured by cooling drums 22 disposed at the opposite end of the oven. Cooling may be accomplished by a circulating water system or a refrigerant. Thereafter the metallized and coated web may be slit or severed into threads in accordance with the usual practice in this art.

The color or luster of the thread produced in the above-described technique is determined by the natural color of the metal deposition. However, it is also possible to generate other colors by adding a dye or pigment to the plaster coating fluid, in which event the resultant color in the finished thread is the combination of the metal and pigment hues. For example, a gold effect may be realized by a silver aluminum metal deposit in combination with a plastic covering having an amber dye or translucent pigment therein. To have the gold effect on either side it is also necessary to color the non-metallized surface and this is best accomplished by applying the pigmented or dyed liquid plastic to this side as well as the metallized side.

As pointed out previously, it is important that the plastic coating on the metallized web be related structurally and have an affinity for the web material. Where the web material is constituted by Mylar, it has been found that an effective coating is one in which the basic make-up of the solids are approximately as follows on a ratio basis per weight:

| | |
|---|---|
| Vinylite VAGH parts | 1 |
| Vinylite VMCH do | 1 |
| Nitrite rubber do | 1 |
| Ultra-violet light absorber | .12 |

The ratio basis of the above constituents may be varied without materially impairing the efficacy of the mixture by reducing the Vinylite VAGH to an extent not exceeding about 30%, and by increasing the Vinylite VMCH to an extent not exceeding about 30%. Alternatively, the Vinylite VAGH may be increased by 30% and the Vinylite VMCH decreased by 30%. However, the Nitrite rubber should be held more or less constant, as well as the ultra-violet light absorber.

The light absorber acts as an anti-oxidant relative to the rubber and in lesser amounts than above indicated is not fully effective. On the other hand, an increased amount would not significantly improve the ultra-violet light resistance of the dried film laid down with the coating composition. The light absorber prevents discoloration of the film.

The Nitrite rubber is availabe commercially from several sources. The Nitrite content may run between 30 to 36% and the balance made up of butadiene. This type of rubber is higher in acro-nitrite content, giving a harder polymer which is necessary to add to the compositions for a non-blocking coating and one that will resist boiling of coating when the coated material is formed into metallic yarn and subjected to various dye and cleaning processes, etc.

The Vinylite VMCH is manufactured by Bakelite Corp. under their trade name, the chemical composition being as follows:

| | Percent |
|---|---|
| Vinyl chloride | 86 |
| Vinyl acetate | 13 |
| Inner polymerized di-basic acid | 1 |

Vinylite VAGH is also manufactured by Bakelite Corp., the chemical constituents being the following:

| | Percent |
|---|---|
| Vinyl chloride | 91 |
| Vinyl acetate | 3 |
| Organic material having hydroxyl group (2.6 times greater when calculated as vinyl alcohol) | 6 |

The function of the Vinylite VMCH is to effect adherence to metallic surfaces and also to plain polyester surfaces. The Vinylite VAGH gives better range for hardness and overall compatibility which allows the introduction of a wider range of colors.

The Vinylite VMCH does not tolerate the addition of many pigments or dyes, and resort is therefore had to VAGH for broader compatibility of colors to be added, as well as to good adhesion, along with a material that is hard, thereby imparting a non-blocking character to the coating film itself. Various types of light fast Azo dyes, vat dyes and various types of pigment dispersions are compatible in this mixture.

This mixture may be dissolved in a straight Ketone system, such as Acetone or M.E.K. where high volatility and evaporation of solvents is desired. For general coating operations on reverse roll coaters, the solvent system may be ⅔ methyl ethyl ketone and ⅓ aromatic hydrocarbon, such as Tuluol solvent. The solids may range between 18 to 23% for a low viscosity mixture.

A metallized thread formed in accordance with the above-described process and including a Mylar base or web will afford increased yardage per pound of Mylar as compared with conventional laminated thread structures since only one ply of Mylar is entailed. And since no adhesive is employed, the plastic coating being integrally bonded to the web, the thread cannot delaminate. Thus, as shown in Fig. 2, the metallized ribbon prior to slitting is constituted by a thermoplastic strip 19, a thin metal coating 20 deposited thereon and a plastic film 21 intimately bonded to the surface of metal deposit 20 to form an integral structure.

While there has been shown and described a preferred embodiment of a metallized yarn in accordance with the invention, it is to be understood that many changes and modifications may be made therein without departing from the essential spirit of the invention. It is intended in the accompanying claims to cover all such changes and modifications as fall within the true spirit of the invention.

Where laminated metallized threads are to be given a color which is a composite of the metal color and a second color, it has heretofore been the practice to coat each side of the ribbon with a pigmented layer to produce for example a gold effect. It has been found that the same result may be obtained more simply and effectively by running the Mylar ribbon through a Dacron dye bath whereby the Mylar itself and the adhesive therefor have the desired color imparted thereto without the need for a colored surface layer.

What is claimed is:

1. The method of producing filamentary metallized threads comprising the steps of passing a relatively broad web of flexible, transparent thermoplastic material through a vacuum chamber to plate one surface thereof with a deposit of metal having a thickness not exceeding one-fifty thousandths of an inch, coating the metallized surface of said web with a transparent plastic material in liquid form, drying and curing said plastic coating to form an adherent film on the metallized surface, said plastic material being non-tacky and having substantially the same tensile strength and elongation characteristics as said web material and having an affinity therefor, and slitting the plastic-coated metallized web to form filamentary threads.

2. The method, as set forth in claim 1, wherein said plastic coating is effected by the reverse roller coating method.

3. The method, as set forth in claim 1, wherein said plastic coating is effected by the rotogravure process.

4. A metallized web adapted to be slit to form continuous filament metallized threads comprising a flexible transparent thermoplastic web, a deposit of metal coating one surface of said web and having a thickness not exceeding $1/50,000$ of an inch, and a transparent film formed of a dried and cured non-tacky plastic material in liquid form covering the surface of said metal deposit and adhering directly thereto, said film being of a material having the same tensile strength and elongation characteristics as the material of said web and having an affinity for the material of said web.

5. A metallized web, as set forth in claim 4, wherein said web is constituted by regenerated cellulose.

6. A metallized web, as set forth in claim 4, wherein said web is constituted by cellulose acetate.

7. A metallized web, as set forth in claim 4, wherein said web is constituted by cellulose tri-acetate.

8. A metallized web, as set forth in claim 4, wherein said web is constituted by cellulose acetate butyrate.

9. A metallized web adapted to be slit to form continuous filament metallized threads comprising a flexible web formed of polymerized ethylene glycol terephthalate, a deposit of metal covering one surface of said web and having a thickness not exceeding $1/50,000$ of an inch, and a transparent film formed of a dried and cured non-tacky plastic material in liquid form covering the surface of said metal deposit and adhering directly thereto, said film being of a material having the same tensile strength and elongation characteristics as the material of said web and having an affinity for the material of said web.

10. A metallized web, as set forth in claim 9, wherein said film is formed by a mixture including a copolymer of vinyl chloride and vinyl acetate with nitrite-butadiene.

11. A metallized web, as set forth in claim 9, wherein said film includes a pigment.

References Cited in the file of this patent

UNITED STATES PATENTS

| | | |
|---|---|---|
| 2,427,334 | Alderfer | Sept. 16, 1947 |
| 2,489,127 | Forgue | Nov. 22, 1949 |
| 2,511,472 | Kmecik | June 13, 1950 |
| 2,653,112 | Roseveare | Sept. 22, 1953 |
| 2,689,802 | Korver | Sept. 21, 1954 |
| 2,689,805 | Croze | Sept. 21, 1954 |
| 2,714,569 | Prindle et al. | Aug. 2, 1955 |
| 2,733,162 | Roseveare | Jan. 31, 1956 |
| 2,740,732 | Peck et al. | Apr. 3, 1956 |
| 2,762,720 | Michel | Sept. 11, 1956 |